No. 837,784. PATENTED DEC. 4, 1906.
E. M. BOSSUET.
DIRIGIBLE BALLOON.
APPLICATION FILED JUNE 14, 1904.

WITNESSES
W. M. Avery
J. P. Davis

INVENTOR
Emile M. Bossuet
BY
Munn & Co
ATTORNEYS

UNITED STATES PATENT OFFICE.

EMILE MÉDÉRIC BOSSUET, OF PARIS, FRANCE.

DIRIGIBLE BALLOON.

No. 837,784.　　　　Specification of Letters Patent.　　　　Patented Dec. 4, 1906.

Application filed June 14, 1904. Serial No. 212,449.

*To all whom it may concern:*

Be it known that I, EMILE MÉDÉRIC BOSSUET, engineer, of 49 Boulevard Haussmann, in the city of Paris, Republic of France, have invented a Dirigible Balloon, of which the following is a full, clear, and exact description.

This invention relates to a dirigible balloon. This new dirigible balloon, the principal body of which is constituted by two conical vessels filled with gas and having their bases opposed and to which vessels a rotary motion is imparted from a motor carried by the balloon, is essentially characterized by, first, its mode of propelling by means of helical wings arranged throughout the length of the conical vessels forming the principal body on two, three, or four lines, so as to form a screw with interrupted multiple threads, the wings of each line being stepped; second, the arrangement of the framing for stiffening or bracing the parts, avoiding any distortion of the whole system and making the same perfectly rigid, while entirely preserving the balloon and its car.

This system of balloon is represented, by way of example, in the accompanying drawings, in which—

Figure 1:
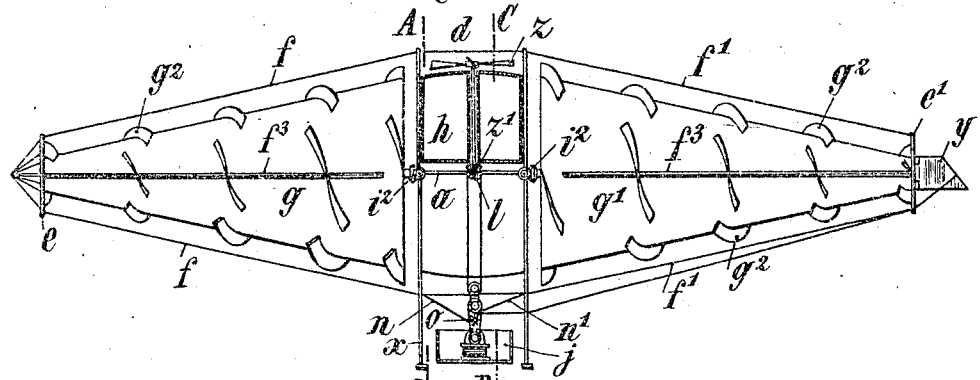
Figure 2:
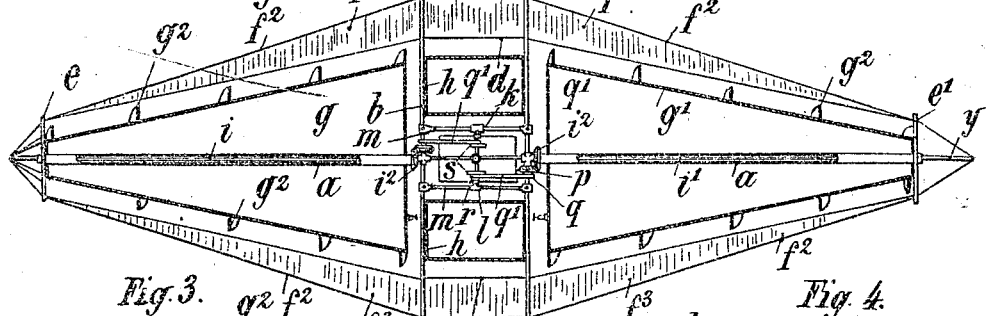
Figure 3:
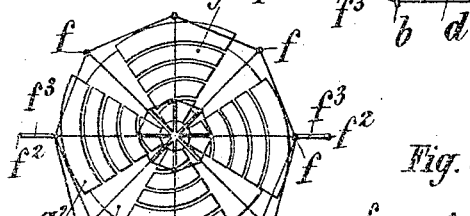
Figure 4:
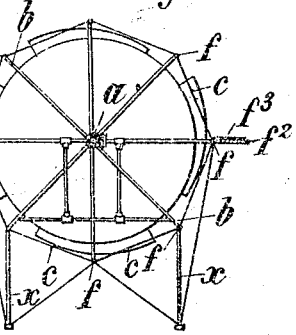
Figure 5:
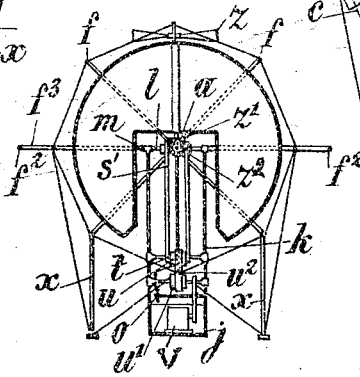

Figure 1 is a longitudinal elevation, the central portion being shown in section. Fig. 2 is a horizontal longitudinal section. Fig. 3 is a view of the front end. Figs. 4 and 5 are two cross-sections, respectively, made according to the lines A B C D of Fig. 1.

In the figures the same letters of reference denote the same parts.

The framework of the balloon is constituted by a longitudinal stationary axis $a$, extending the whole length of the balloon and carrying, first, at its central part two frames $b\ b'$, each composed of radial arms connected together by steel wires $c$, Fig. 4, both frames $b\ b'$ being connected together by means of ties $d$; second, at both ends two other frames $e\ e'$ of smaller size, also composed of stationary radial arms connected together by means of steel wires.

The frames $b\ e$ are connected together by means of stretchers or stays $f$, fastened to the end of the arms of these frames and finally to the front end of the longitudinal shaft $a$. Any stretching or tightening device can be used to regulate the tension of said stays.

The frames $b'\ e'$ are also connected together by means of stretchers or stays $f'$. The axis $a$ thus provided with its frames $b\ b'\ e\ e'$ possesses an absolute rigidity and a very great resistance to flexure.

The horizontal arms of the four frames have extensions, respectively connected the one to the other by means of auxiliary stretchers $f^2$, in view of allowing to arrange a horizontal strip $f^3$, of light metal or any cloth, extending on each side and upon the whole length of the balloon. This band has for its purpose to maintain a straight direction, to avoid any rolling, and to serve as a parachute.

The body of the balloon consists of, first, two frustum-shaped bodies or vessels $g\ g'$, respectively, arranged between the frames $b\ e$ and $b'\ e'$; second, a central body or vessel $h$, included between the two frames $b\ b'$.

The cones $g\ g'$ consist of a casing of aluminium, rubber cloth, silk, or any other suitable material carried by a frame of any kind and mounted upon a central tube $i\ i'$. The tubes $i\ i'$, mounted on the axis $a$, can rotate freely on the latter through ball-bearings.

The cones can be divided by means of inner walls into several distinct compartments. By way of safety each of them is provided with a valve opening externally, and the spring of which is so arranged as to allow this valve to open when the internal pressure goes beyond a certain extent.

Each conical body $g\ g'$ carries externally a series of helical wings $g^3$, arranged on a certain number of lines, so as to constitute a screw with interrupted multiplex threads and extended pitch, so as to allow a rapid progress of the balloon without requiring a great speed of rotation of the conical bodies $g\ g'$. By this special arrangement of helical wings on a line in a stepped way the wings of a row will leave between them and those of the next row a free rectilinear space in which air can freely circulate. These free spaces provided between the wings constitute on the surface of the balloon rectilinear ways in which air is engulfed. Accordingly every wing whatever its distance from the top of the frustum may be strikes in rotating the air introduced in these passages. In these conditions all the wings work and have the greatest efficiency.

The two conical bodies $g\ g'$, which constitute the propelling parts, have imparted to them a rotary motion controlled as hereinafter specified. On the contrary, the central body $h$ is firmly secured to the two frames $b\ b'$. The car $j$ is suspended through two standards $k$, Fig. 5, which can freely swing upon the cross-shaft $l$, carried by the cross-bars $m$, which connect the two central frames $b\ b'$.

The position of the car relatively to the body of the balloon is insured by four ropes $n\ n\ n'\ n'$, fastened to the frames $b\ b'$ and winding over a small windlass $o$, carried by the standards of the car. When this windlass is turned in either direction, a pull is exerted either on the ropes $n$ or on the ropes $n'$, whereby the car is shifted between the frames $b\ b'$ and accordingly the center of gravity of the balloon either toward the fore part or toward the aft, the balloon then pointing downward or upward and ascending or descending in virtue of the rotation of the cones $g\ g'$, provided with helical wings.

Each conical body $g\ g'$ derives its rotary motion from the following device: Each tube $i\ i'$ of the conical bodies $g\ g'$ carries a bevel-pinion $i^2$, meshing with the pinion $p$, fast with the pulley $q$, driven by the belt $q'$, passing over a pulley $r$, which is fast with a pulley $s$, deriving its motion from a pulley $t$ through the medium of a belt $s'$. The two pulleys $t$ are keyed upon the shaft of the upper cone $u$ of a speed-changing gear, the lower cone $u'$ of which, driven by a motor of any kind $v$, actuates the upper cone $u$ through the medium of the belt $u^2$, adapted to be displaced along these cones in order to allow to vary the speed imparted to the conical bodies $g\ g'$ and also the speed of the balloon.

It is well understood that any system of speed-changing gear can be used and that the same can even be dispensed with if the motor is so arranged as to enable to regulate its speed.

The central frames $b\ b'$ further carry four side props $x$, the ends of which are at the same level as the bottom of the car and serve as a rest for the balloon when on the ground. These side props can be pivoted, so as to be able to be folded.

A rudder $y$ is arranged at the back part of the balloon for steering the same either toward the right or the left.

The balloon can also be provided above the central body $h$ with a screw $z$, turning in a horizontal plane and adapted to cause the balloon to ascend when the latter is heavier than air, this screw being driven through any suitable means. This screw $z$ will be keyed, for instance, upon a shaft passing through the central body $h$ and carrying at its end a bevel-pinion $z'$, gearing with a pinion $z^2$, fast with one of the two pulleys $r$. Any suitable clutch will allow of setting this screw $z$ into motion at the required moment.

The forms, sizes, and details can of course vary according to the requirements.

I claim—

1. A dirigible balloon comprising a vessel of conical shape filled with gas and rotating about its longitudinal axis, wings arranged on a certain number of generating-lines and being of helical shape so as to constitute a screw with interrupted multiple threads and with elongated pitch, the length of these wings increasing from the top toward the base of the frustum and the ends of the wings arranged on the same line being on the same generating-lines, the group of wings arranged on the same line and the group of wings arranged on the following line leaving between them free rectilinear spaces upon the whole length of the vessel and allowing the free circulation of air, the wings on the same line being stepped in order that the base of each wing will be on or above a line parallel to the longitudinal axis of the balloon and passing at the external edge of the wing of the next coil, when seen from the top of the vessel, substantially as described.

2. A dirigible balloon comprising two vessels of conical shape having their bases arranged opposite to each other, the said vessels being filled with gas, rotating about their longitudinal axis, and being each provided with wings of helical shape so as to constitute a screw with interrupted multiple threads and with elongated pitch, the length of these wings increasing from the top toward the base of the frustum and the ends of the wings arranged on the same line being on the same generating-lines, the group of wings arranged on the same line and the group of wings arranged on the following line leaving between them free rectilinear spaces upon the whole length of the vessel and allowing the free circulation of air, the wings on the same line being stepped in order that the base of each wing will be on or above a line parallel to the longitudinal axis of the balloon and passing at the external edge of the wing of the next coil, when seen from the top of the vessel, substantially as described.

3. A dirigible balloon having a skeleton frame comprising a longitudinal axis, two central frames secured to the axis and having radial arms, similar but smaller frames secured to the ends of the axis, stays connecting the ends of the radial arms with each other and with the ends of the axis, two conical hollow bodies filled with gas, and mounted to turn on the axis between the central and end frames, helically-arranged propelling-wings on the external surface of said conical bodies, a car suspended from the balloon, a motor located in the car, means for transmitting motion from the motor to the conical bodies, cables connected with the central frames, and a windlass in the car on which said cables are wound.

The foregoing specification of my steering-balloon signed by me this 31st day of May, 1904.

EMILE MÉDÉRIC BOSSUET.

Witnesses:
  HANSON C. COXE,
  MAURICE H. PIQUET.